UNITED STATES PATENT OFFICE.

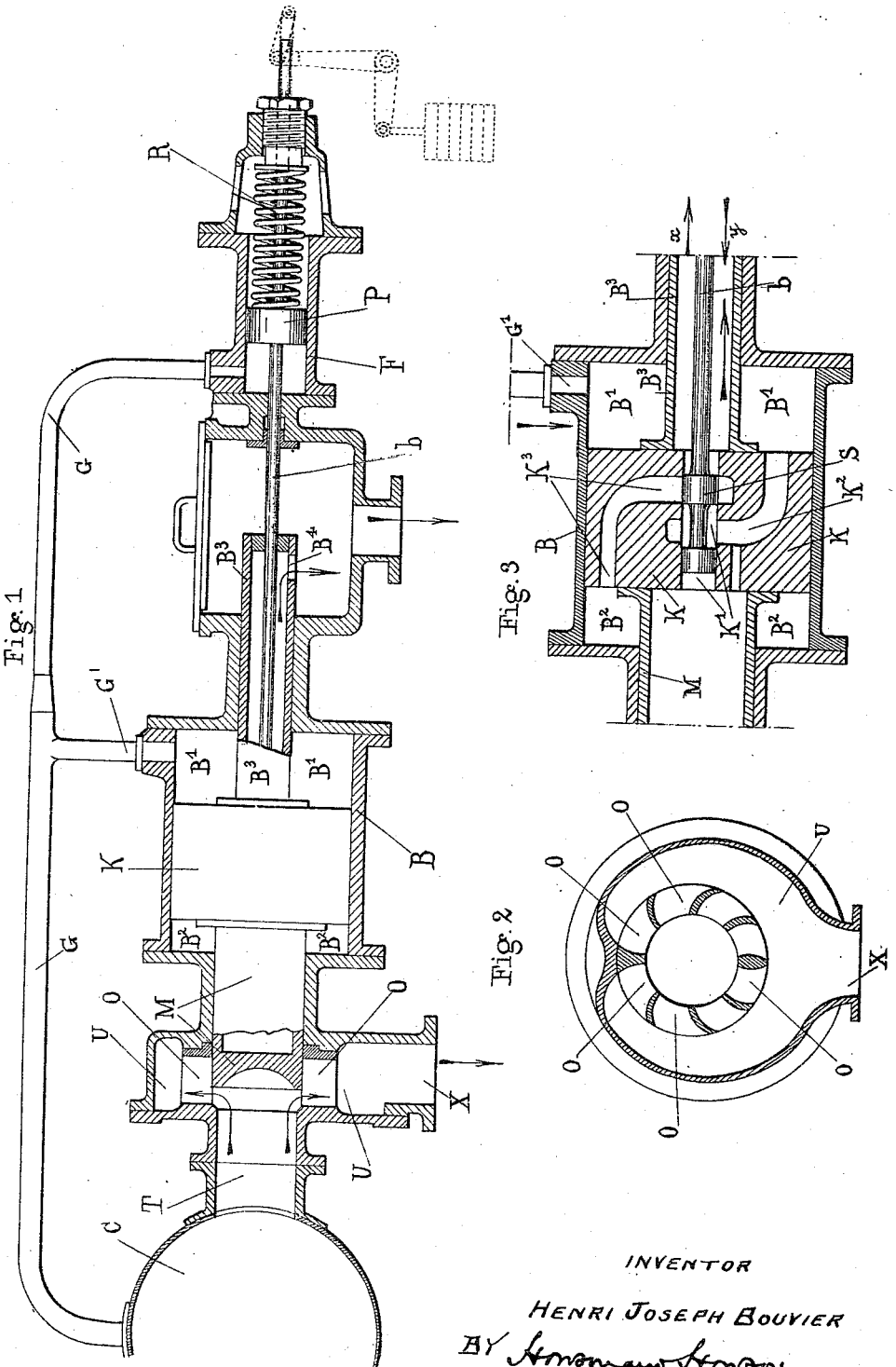

HENRI JOSEPH BOUVIER, OF GRENOBLE, FRANCE.

AUTOMATIC PRESSURE-REGULATOR FOR PIPES.

1,284,227.  Specification of Letters Patent.  Patented Nov. 12, 1918.

Application filed February 15, 1918. Serial No. 217,438.

*To all whom it may concern:*

Be it known that I, HENRI JOSEPH BOUVIER, engineer, a citizen of the Republic of France, and a resident of 53 Rue du Polygone, Grenoble, Department of Isère, France, have invented new and useful Improvements in Automatic Pressure-Regulators for Pipes, of which the following is a specification.

The subject of the present invention is an apparatus intended to prevent the occurrence of hammering in water pipes (mains).

It is well known that every variation of flow in a water pipe leads to variations of pressure and sometimes to excess pressures which may amount to very high figures. In order to resist these excess pressures there is a general tendency to increase to a certain extent the thickness of the walls of the water pipes so as to obtain the necessary safety.

Numerous contrivances have been designed hitherto to prevent the occurrence of hammering, but the appliances so far adopted are only palliatives of lesser or greater, but always inadequate, efficiency. No apparatus automatically gives the desired result.

The apparatus forming the subject of this invention solves the problem completely in the sense that its operation is automatic and entirely independent of the agencies for opening or closing the apertures through which the flow out of the water from the water pipe takes place.

This appliance comprises a piston receiving on one of its faces the pressure of the water main which is counterbalanced by an opposing spring acting on the opposite face of the piston, the latter being connected by means of a servo-motor to a piston acting as a valve which, owing to the displacements of the spring piston transmitted through the servo-motor, closes or opens the outlet apertures which in the case of variations of flow in the principal main, give rise to an outflow of a part of the water from this main in sufficient quantity to prevent the occurrence of any dangerous excess pressure.

The drawing appended represents by way of example a form of construction of the invention:

Figure 1 is a longitudinal section along the axis of the apparatus, part in an outside view.

Fig. 2 is a cross-section through the piston which acts as a valve regulating the outflow of a certain quantity of water.

Fig. 3 is an axial longitudinal section through the servo-motor.

The appliance consists essentially of a piston P (Fig. 1) which receives on one of its faces the pressure exerted at any moment in the main C, which is in connection through a pipe G with a cylinder F inclosing piston P. On the other face of this piston there acts a spring R, which counterbalances the stress resulting from the water pressure on the piston. A tightening device permits of regulating the initial tension of this spring R. With the object of increasing the sensitiveness of this spring R a part of the stress sustained by the piston P may be counter-balanced by a counter-weight (see by way of example the arrangement represented by dotted lines on Fig. 1) or by means of an additional piston actuated by any fluid (oil, water, etc.) maintained at a constant pressure. This partial balancing of the strain sustained by the piston P allows of diminishing to the same extent the power of the spring R, the effect of which will be to render this spring so much the more sensitive to the variations of pressure which occur, both in the cylinder F and in the main C; these variations of pressure will thus be manifested by greater compressions of the spring R. Whatever the arrangement adopted for the partial balancing of the strain exerted on the piston P the spring R must always undergo a compression which will correspond either to the entire pressure or at least to the variations of pressure in the main C. When the pressure in the main increases the spring R will be more compressed; it will relax, on the contrary, if this pressure falls off.

The piston P is connected by means of a rod *b* to the valve S of a servo-motor acting as a relay, mounted in a cylinder B (Figs. 1 and 3) and arranged in such manner that the piston K of this servo-motor follows all the displacements of the valve S. This servo-motor may be actuated either by the water of the main C, if the pressure is sufficient, or by any other liquid fluid under pressure.

The piston K of this servo-motor, the construction and operation of which is known, is connected direct to a piston M acting as a valve (Fig. 1); the water under pressure constantly arrives through the branch $G^1$ on the right face of the piston K, in the annular space $B^1$ lying between the inner wall of the cylinder B and the outer wall of the cylindrical tube $B^3$, into which there passes the rod $b$ connecting the valve S with the piston P. Through the piston K there is cut a central conduit $K^1$ into which there run two lateral channels $K^2$ and $K^3$. In the ordinary course of events the valve S prevents communication between the channels $K^2$ and $K^3$ (position shown on Fig. 3).

If the valve S, owing to a displacement of the piston P, is displaced in the direction of the arrow $x$, communcation is established between the channels $K^2$, $K^1$ and $K^3$; the annular space $B^2$, lying between the valve piston M and the interior wall of the cylinder B, is put into communication with the water under pressure coming from the branch $G^1$ into the annular space $B^1$. On the other hand the pressure of the water in the main C is exerted on the entire surface of the valve piston M; the piston K thus receives from the left side a water pressure on a surface corresponding to its entire diameter, while on its right side the water pressure is only exerted on a surface corresponding to the annular space $B^1$. The result of this inequality of the pressure on the two faces of the piston is that the latter is displaced in the direction of the arrow $x$; this displacement will cease when the axial aperture of the channel $K^3$ will have returned to its position opposite the body S of the valve. In short, the piston K will have effected in the direction of the arrow $x$ a displacement equal to and in the same direction as that of the valve S.

When a displacement of the piston P in the opposite direction takes place, the valve S is displaced in the direction of the arrow $y$ and the annular space $B^2$ is put into communication through the channels $K^3$ and $K^1$ with the outlet or exhaust which is effected through the interior of the cylindrical tube $B^3$ and the aperture $B^4$. The pressure exerted on the right side of the piston K thus becomes at that moment greater than the pressure which is exerted on the piston M, and owing to this inequality of pressure the piston K will undergo displacement in the direction of the arrow $y$. This displacement will cease, as in the preceding case, when the axial aperture of the channel $K^3$ has again come back in front of the body S of the valve; as in the first case, the piston K will have effected a displacement identical with that of the valve S.

To sum up, the object of the interposition of the servo-motor is to compel the valve piston M to undergo all the displacements effected by the rod $b$ to which is connected the valve S. The servo-motor therefore plays the part of a relay.

It need not be said that the piston K of the servo-motor can be coupled up with the valve piston M either directly if the driving fluid is taken from the water main (which is the case shown in Fig. 1), or indirectly by means of suitably disposed rods and levers.

In normal operation, that is to say, when there is no excess pressure in the water main C, the valve piston M shuts off apertures OO, the total section of which is appropriately calculated. At the same time the piston K of the servo-motor, the control valve S of the latter and the piston P occupy positions that correspond to the position of closure by the piston M of the apertures O. If a sudden variation in flow should occur its immediate consequence will be an excess pressure in the water main C; this excess pressure, small at first, is instantaneously transmitted through the tube G on to the left face of the piston P; the spring R is compressed and the piston B is displaced by the corresponding amount, carrying with it the valve S in its displacement.

The piston of the servo-motor follows the movement of the valve S; the same is the case with the valve piston M, which effects the same stroke, which brings about the gradual opening of the apertures O; the latter then allow the outflow of a certain quantity of water coming from the main C through the communication pipe T.

It will be readily understood that if the total section of the apertures O is suitably calculated the quantity of which will escape may be sufficient to limit to a very small relative amount the excess pressure which is held up in the main.

It will also be understood that if no fresh variations of flow occur, the slight excess pressure which has taken place will be more and more reduced and disappear completely after a certain time. The result is that the opposition spring R, subjected to less and less pressure, expands little by little and gradually forces back the piston P in order, finally, to bring it back to its initial position. This return of the piston P brings about the slow and gradual closure of the apertures O owing to the fact that the pistons K and M simultaneously follow the displacements effected by the piston P. This opening of the apertures O, afterward very gradually closing again, results in obviating the excess pressures due to hammering; the loss of driving water resulting from the momentary opening of the apertures O for a very short time cannot be of any importance.

The servo-motor must be made of sufficient power in order that all the displacements of the valve S may be reproduced immediately and without any delay by the piston K, for all the positions which the valve S may occupy.

Furthermore, during the whole of the time when the pressure remains normal in the main C, the valve piston M must be maintained strongly held on its seat in order to avoid leakage through the apertures O. This result is obtained by a suitable regulation of the spring R, so that for normal pressure in the main C the position of the piston P, and consequently of the valve S, gives a slight opening of the channel $K^3$, causing communication of the annular space $B^2$ with the discharge through $K^3$, $K^1$, $B^3$ and $B^4$, the piston K being thus pushed back in the direction of the arrow $y$ (Fig. 3).

It need hardly be said that the valve S and the servo-motor may be either coupled direct to the piston P as has been shown on the drawing, or coupled by means of suitably fitted levers with the object of reproducing, reducing or amplifying in the piston K the displacements effected by the piston P.

The same is the case as regards the valve piston M which may be coupled directly (which is the case shown on the drawing), or else coupled by means of levers with the piston K of the servo-motor.

In the event of the normal pressure ($p$) which exists in the power main reaching high amounts, resulting in great speeds of discharge of the water through the apertures O, it may be necessary to reduce this speed of discharge in order to avoid over-rapid wear of the walls of the apertures. With that object the discharge chamber U which follows the apertures O may be kept full of water by suitably disposing the pipe X, through which the water passes out and it will suffice to fit to this pipe end a splasher (pressure reducer) of any design in order that there be immediately created at the moment of outflow through the apertures O, in the discharge chamber U, an intermediate pressure ($p'$). The speed of discharge through the apertures O will then no longer be a function of the pressure ($p$), but that of the difference ($p-p'$).

Of course the section of the apertures O will be calculated so as to allow of this modification in the speed of outflow of the water.

The foregoing exposition allows of a clear realization of the effectiveness of the system and its entirely automatic operation.

The discharge of a sufficient quantity of water through the discharge apertures O prevents any excess pressure which has begun from growing and reaching a dangerous amount. It will readily be understood that it is sufficient to calculate and design suitably the different parts of the apparatus to obtain all desirable sensitiveness.

The use of the apparatus I have just described will result in its being no longer necessary to provide hydraulic motors with outflow compensators or jet deflectors controlled by the gate valve agencies and the effect is such as to reduce the water hammering.

These appliances, which possess some efficiency in avoiding excess pressure when it is a question of sudden discharges from the motors giving rise to rapid closures of the apertures of the distributers, are powerless where it is a question of obviating the effects due to sudden overloads.

It is well known in fact that every sudden overload necessarily brings about the rapid opening of the apertures of the distributers in hydraulic motors, the speed of which is to be maintained practically constant. These sudden openings give rise to hammerings first of a negative character, but immediately followed by positive hammerings which may sometimes reach comparatively very high proportions.

The appliance described, preventing the occurrence of any dangerous excess pressure, immediately stops all the phenomena of oscillation of the moving column of water and thus does away with all the injurious effects of hammering whether rapid increases or reductions in the flow of the main are in question.

Having now particularly described and ascertained the nature of my said invention and in what manner the same is to be performed, I declare that what I claim is:—

An automatic pressure regulator preventing the occurrence of hammerings in water mains, this appliance comprising a piston receiving on one of its faces the pressure of the water main, and counterbalanced by an opposing spring acting on its opposite face, said piston being connected by means of a servo-motor to a piston acting as a valve, which, owing to the displacements of the spring piston, transmitted by the servo-motor, shuts off or opens exhaust openings which in case of variation of flow in the principal main, permit a discharge of a part of the water from this main in sufficient quantity to prevent the occurrence of any dangerous excess pressure.

In testimony whereof I have signed my name to this specification.

HENRI JOSEPH BOUVIER.

Witnesses:
 ED. MAIZONNIER,
 R. GAZAL.